(12) United States Patent
Hung et al.

(10) Patent No.: US 9,876,373 B2
(45) Date of Patent: Jan. 23, 2018

(54) CHARGING CABINET AND STORAGE DEVICE THEREOF

(71) Applicant: AVer Information Inc., New Taipei (TW)

(72) Inventors: Hui-Lun Hung, New Taipei (TW); Shu-Chen Chen, New Taipei (TW)

(73) Assignee: AVer Information Inc (TW)

( * ) Notice: Subject to any disclaimer, the term of this patent is extended or adjusted under 35 U.S.C. 154(b) by 172 days.

(21) Appl. No.: 14/830,979

(22) Filed: Aug. 20, 2015

(65) Prior Publication Data

US 2016/0056652 A1    Feb. 25, 2016

(51) Int. Cl.
    *H02J 7/00* (2006.01)

(52) U.S. Cl.
    CPC .................. *H02J 7/0044* (2013.01)

(58) Field of Classification Search
    CPC .................................................... H02J 7/0044
    USPC ......................................................... 320/114
    See application file for complete search history.

(56) References Cited

U.S. PATENT DOCUMENTS

| | | | |
|---|---|---|---|
| 4,244,129 A | | 1/1981 | Foerster et al. |
| 5,032,053 A | * | 7/1991 | Krieg ................... B65G 1/0435 414/278 |
| 5,461,717 A | * | 10/1995 | Notarianni ............ G06F 1/1632 361/727 |
| 2008/0302742 A1 | * | 12/2008 | Fulmer ................. A47B 57/583 211/59.4 |
| 2010/0176762 A1 | * | 7/2010 | Daymude ............. H02J 7/0044 320/115 |
| 2013/0113420 A1 | * | 5/2013 | Majoris, Jr. ........... H02J 7/0044 320/107 |
| 2013/0175993 A1 | * | 7/2013 | Chen ..................... H02J 7/0027 320/114 |
| 2013/0200584 A1 | * | 8/2013 | Guasta ................... B62B 3/005 280/79.2 |
| 2014/0305891 A1 | * | 10/2014 | Vogler ................... A47F 1/125 211/59.3 |

FOREIGN PATENT DOCUMENTS

| | | |
|---|---|---|
| CN | 102973009 | 3/2013 |
| TW | 277744 | 7/1995 |
| TW | M323837 | 5/2007 |

* cited by examiner

*Primary Examiner* — Suresh Memula (57) ABSTRACT

A storage device includes a frame and a plurality of adjusting structures. The frame includes a base and a plurality of partition components. The partition components stand on the base so that the partition components and the base form a plurality of accommodation spaces together. Each of the adjusting structures includes a sliding component and a blocking component that are connected to each other. The sliding components are slidable on the base. The blocking components are located within the accommodation spaces, respectively. The blocking components protrude from the base so that the base, the partition components and the blocking components form a plurality of storage compartments together. The sliding components are for sliding relative to the base so as to respectively adjust depths of the storage compartments.

10 Claims, 11 Drawing Sheets

CHARGING CABINET AND STORAGE DEVICE THEREOF

CROSS-REFERENCE TO RELATED APPLICATIONS

This non-provisional application claims priority under 35 U.S.C. §119(a) on Patent Application No(s). 103129054 filed in Taiwan, R.O.C. on Aug. 22, 2014, the entire contents of which are hereby incorporated by reference.

TECHNICAL FIELD

The disclosure relates to a charging cabinet and a storage device thereof, more particularly to a storage device with adjustable storage compartments and a charging cabinet having the storage device.

BACKGROUND

Since mobile electronic devices have many advantages such as being highly portable, simple to operate, highly entertaining, excellent extension capability and with excellent display capabilities, many educational institutions use the mobile electronic devices as the multimedia devices for education. Generally, the educational institutions purchase the mobile electronic devices and the charging cabinets at the same time. The charging cabinet is used for storing and charging the mobile electronic devices.

SUMMARY

According to one aspect of to the disclosure, a storage device includes a frame and a plurality of adjusting structures. The frame includes a base and a plurality of partition components. The partition components stand on the base so that the partition components and the base together form a plurality of accommodation spaces. Each of the adjusting structures includes a sliding component and a blocking component that are connected to each other. The sliding components are slidably disposed on the base. The blocking components are located within the accommodation spaces, respectively. The blocking components protrude from the base so that the base. the partition components and the blocking components together form a plurality of storage compartments. The sliding components are for sliding relative to the base so as to adjust depths of the storage compartments respectively.

According to another aspect of the disclosure, a charging cabinet includes a case, a power supply and the aforementioned storage device. The power supply is disposed in the case, and the power supply includes a plurality of sockets. The storage device is disposed in the case.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
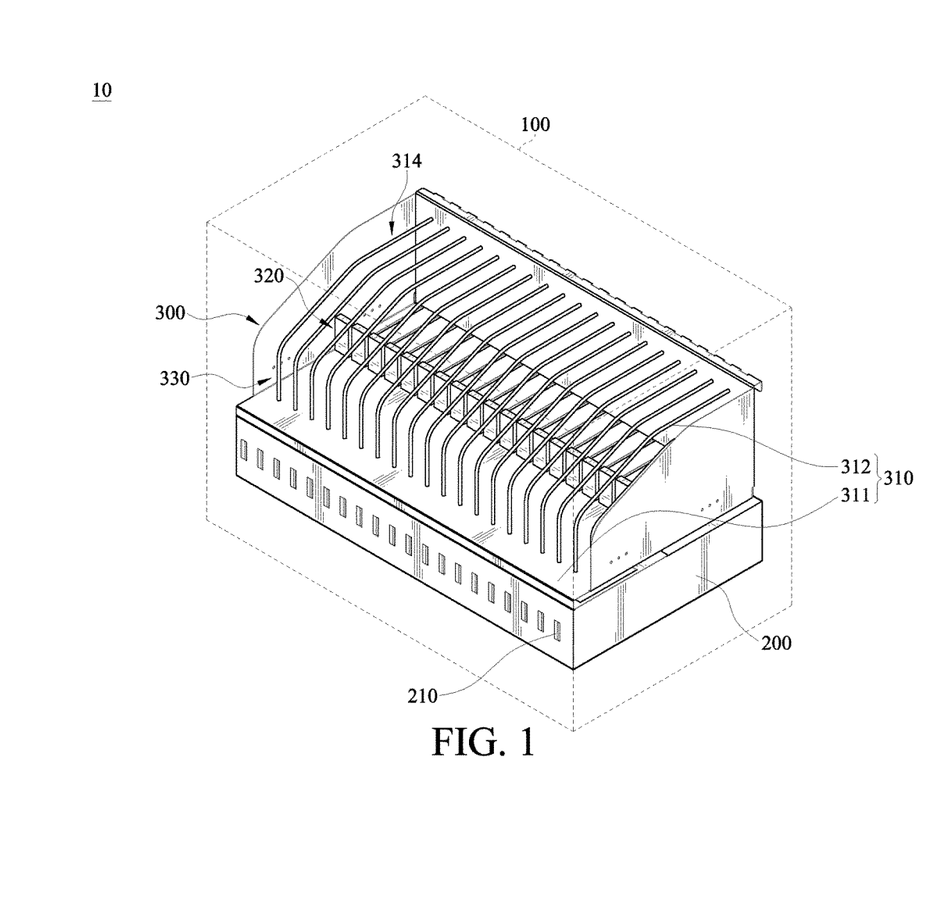
FIG. 1 is a perspective view of a charging cabinet according to a first embodiment.
Figure 2:
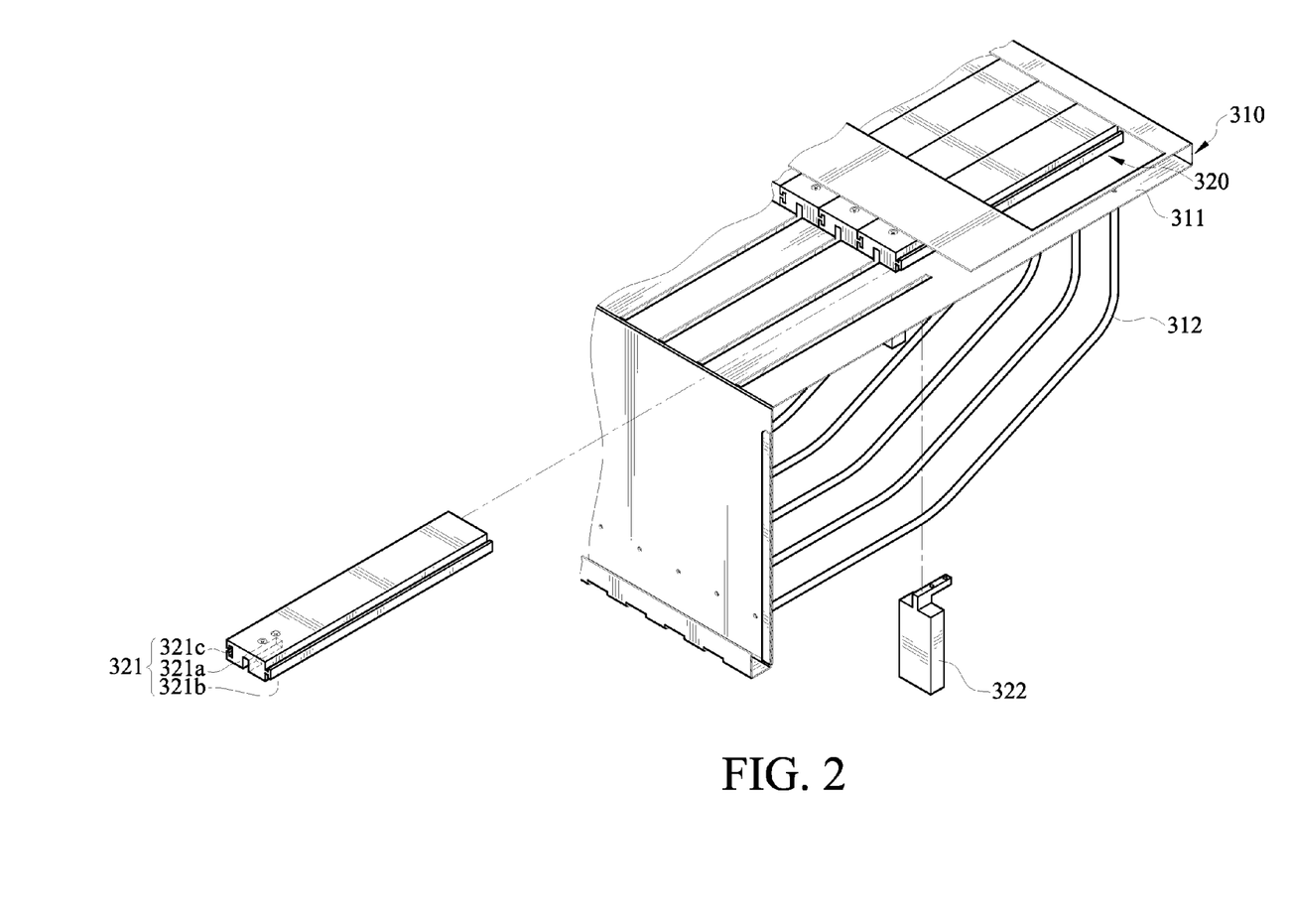
FIG. 2 is an exploded view of a storage device of the charging cabinet in FIG. 1.
Figure 3:
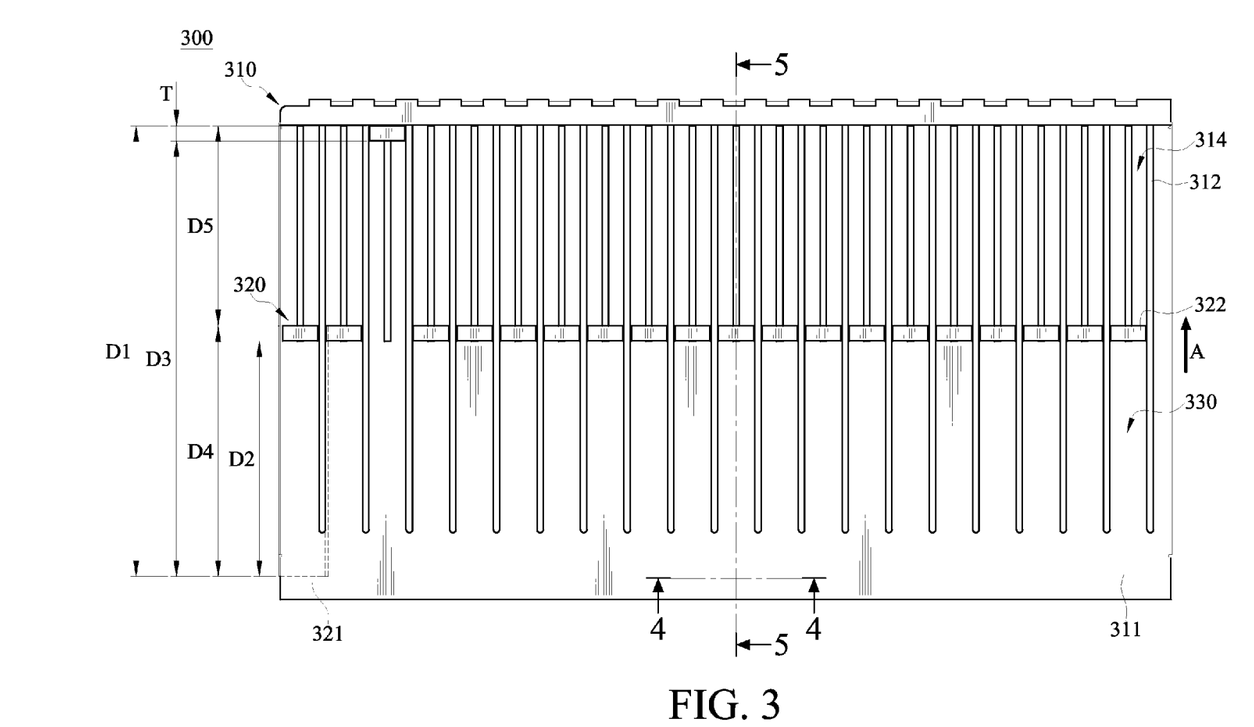
FIG. 3 is a top view of the storage device in FIG. 1.

Please refer to FIG. 1 to FIG. 3. FIG. 1 is a perspective view of a charging cabinet according to a first embodiment. FIG. 2 is an exploded view of a storage device of the charging cabinet in FIG. 1. FIG. 3 is a top view of the storage device in FIG. 1.

In this embodiment, a charging cabinet 10 includes a case 100, a power supply 200 and a storage device 300. The charging cabinet 10 is for storing a plurality of mobile electronic devices and charging the mobile electronic devices (not shown in the drawings). The mobile electronic device is for example, a tablet, laptop or smart phone. The power supply 200 is disposed in the case 100, and the power supply 200 includes a plurality of sockets 210. Each of the sockets 210 is for electrically connecting the mobile electronic device to the power supply 200 via a cable (not shown in the drawings) so that the power supply 200 is capable of charging the mobile electronic device.

The storage device 300 is disposed in the case 100, and the storage device 300 includes a frame 310 and a plurality of adjusting structures 320. The storage device 300 is located above the power supply 200, but the disclosure is not limited thereto. In some other embodiments, the storage device 300 can be located beneath or next to the power supply 200.

The frame 310 includes a base 311 and a plurality of partition components 312. The base 311 is, for example, a metal board, a plastic board or a metal gauze. The partition component 312 is, for example, a metal bar, a metal plate or a plastic plate. There is a gap located between every two partition components 312 that are adjacent to each other. The partition components 312 stand on the base 311 so that the partition components 312 and the base 311 together form a plurality of accommodation spaces 314. A depth D1 of the accommodation space 314 can correspond to a length of the biggest mobile electronic device in the market. For example, the depth D1 of the accommodation space 314 is equal to the length of the biggest mobile electronic device in the market.

Each of the adjusting structures 320 includes a sliding component 321 and a blocking component 322 that are connected to each other. The sliding components 321 are slidably disposed on the base 311. The blocking components 322 are located within the accommodation spaces 314, respectively, and the blocking components 322 protrude from the base 311 so that the base 311, the partition components 312 and the blocking components 322 together form a plurality of storage compartments 330. The position and the number of the sockets 210 correspond to the position and the number of the storage compartments 330, respectively. For example, the projections of the sockets 210 on the base 311 are overlapped with the projections of the storage compartments 330 on the base 311, and the number of the sockets 210 is equal to the number of the storage compartments 330. In detail, as shown in FIG. 2, the sliding component 321 is disposed on a bottom side of the base 311. The blocking component 322 protrudes from the base 311 and is fastened to the sliding component 321. Therefore, the sliding component 321 of the adjusting structure 320 is for sliding relative to the base 311 of the frame 310 along a sliding direction A (the arrow shown in FIG. 3) so as to adjust a depth of the storage compartment 330, thereby providing a minimum depth D2 of the storage compartment 330 and a maximum depth D3 of the storage compartment 330. In this embodiment, the maximum depth D3 of the storage compartment 330 is defined as the difference between the depth D1 of the accommodation space 314 and the thickness T of the blocking component 322. That is, the following condition is satisfied: D3=D1−T.

Figure 4:
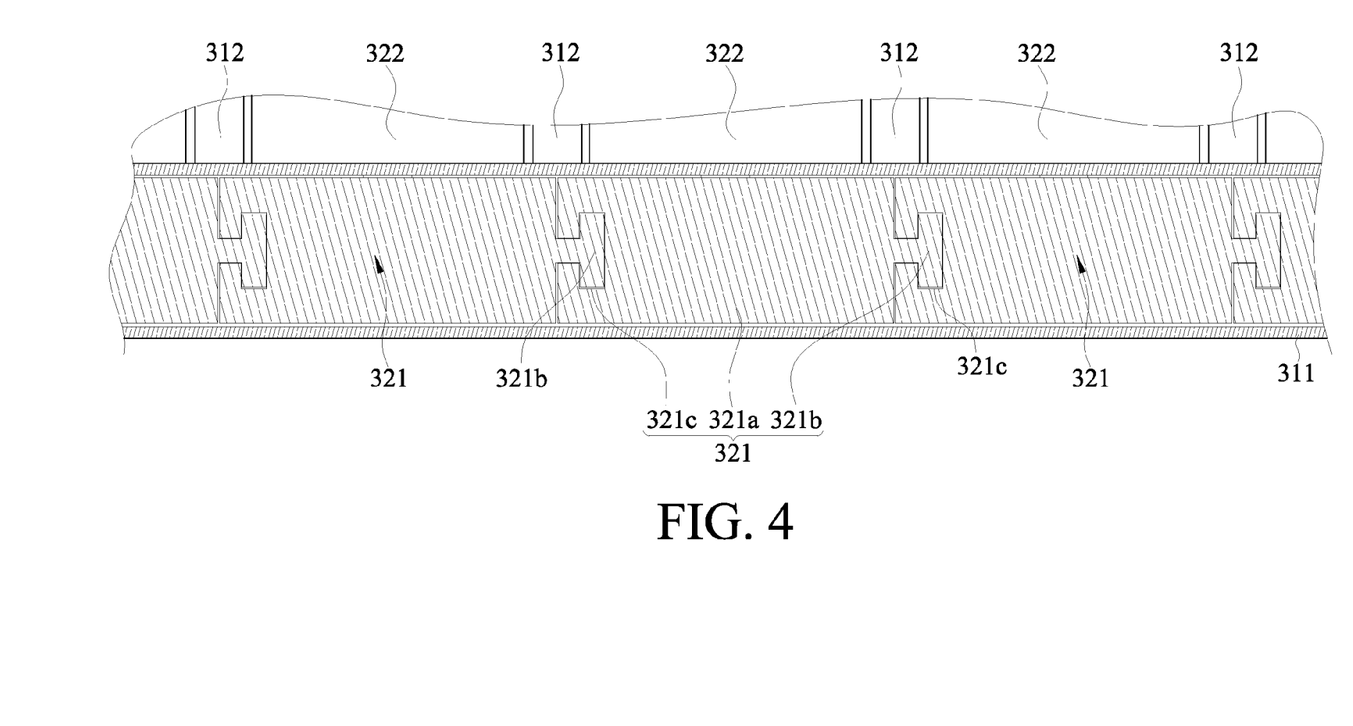
FIG. 4 is a cross-sectional view of the storage device along a line 4-4 in FIG. 3.
Figure 5:
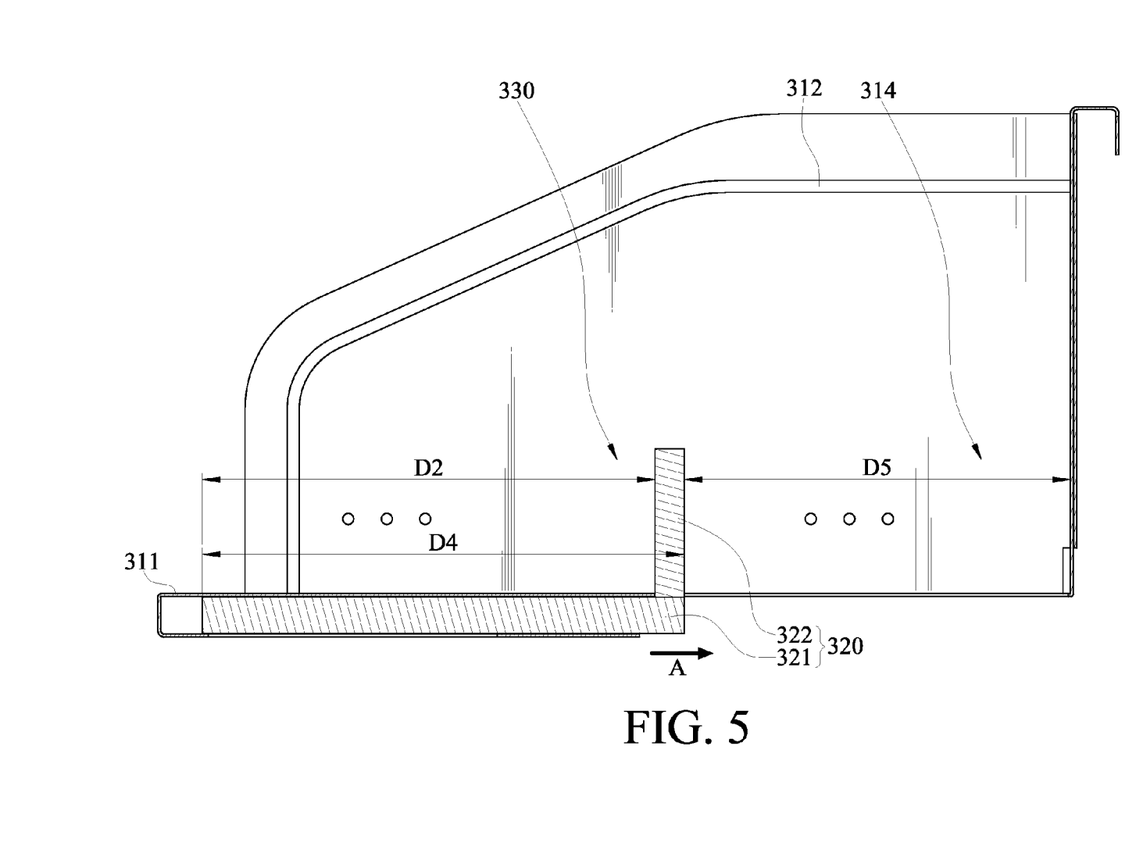
FIG. 5 is a cross-sectional view of the storage device along a line 5-5 in FIG. 3.

The sliding components 321 are jointed together. Please refer to FIG. 4 and FIG. 5. FIG. 4 is a cross-sectional view of the storage device along a line 4-4 in FIG. 3. FIG. 5 is a cross-sectional view of the storage device along a line 5-5 in FIG. 3. In this embodiment, each of the sliding components 321 includes a main part 321a, a first jointed part 321b and a second joint part 321c. The blocking components 322 are fastened to the main parts 321a, respectively. The first joint part 321b and the second joint part 321c are located at two sides of the main part 321a that are opposite to each other, respectively. For three of the sliding components 321 that are arranged in sequence, the first joint part 321b and the second joint part 321c of one of the three sliding components 321 are interposed into the second joint part 321c of another one of the three sliding components 321 and the first joint part 321b of the other one of the three sliding components 321, respectively. That is, the first joint part 321b and the second joint part 321c, facing towards each other, are interlocked with each other (fastened to each other). Moreover, as shown in FIG. 3 and FIG. 5, a length D4 of the sliding component 321 along the sliding direction A is greater than a maximum slidable distance D5 of the sliding component 321 so as to prevent the sliding component 321 from separating from the base 311 when the sliding component 321 approaches an edge of the slidable area of the sliding component 321.

In this embodiment, the first joint part 321b is a protrusion, and the second joint part 321c is a slot corresponding to the protrusion. In detail, the first joint part 321b and the second joint part 321c are a T-shaped protrusion and a T-shaped slot, respectively, but the disclosure is not limited thereto. In some other embodiments, both of the first joint part 321b and the second joint part 321c can be L-shaped or fan-shaped (dovetail shaped).

Figure 6:
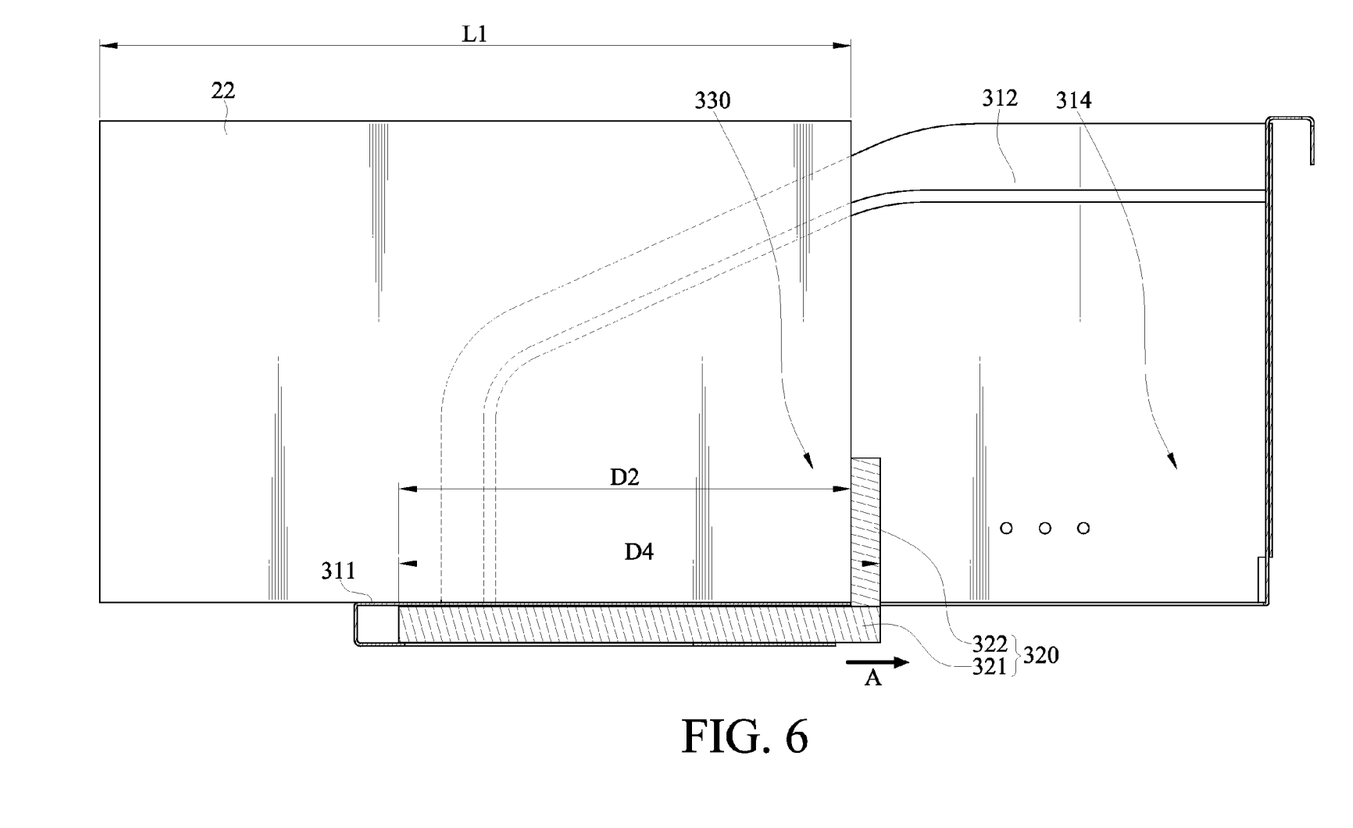
FIG. 6 is a cross-sectional view of the storage device with a mobile electronic device according to the first embodiment.
Figure 7:
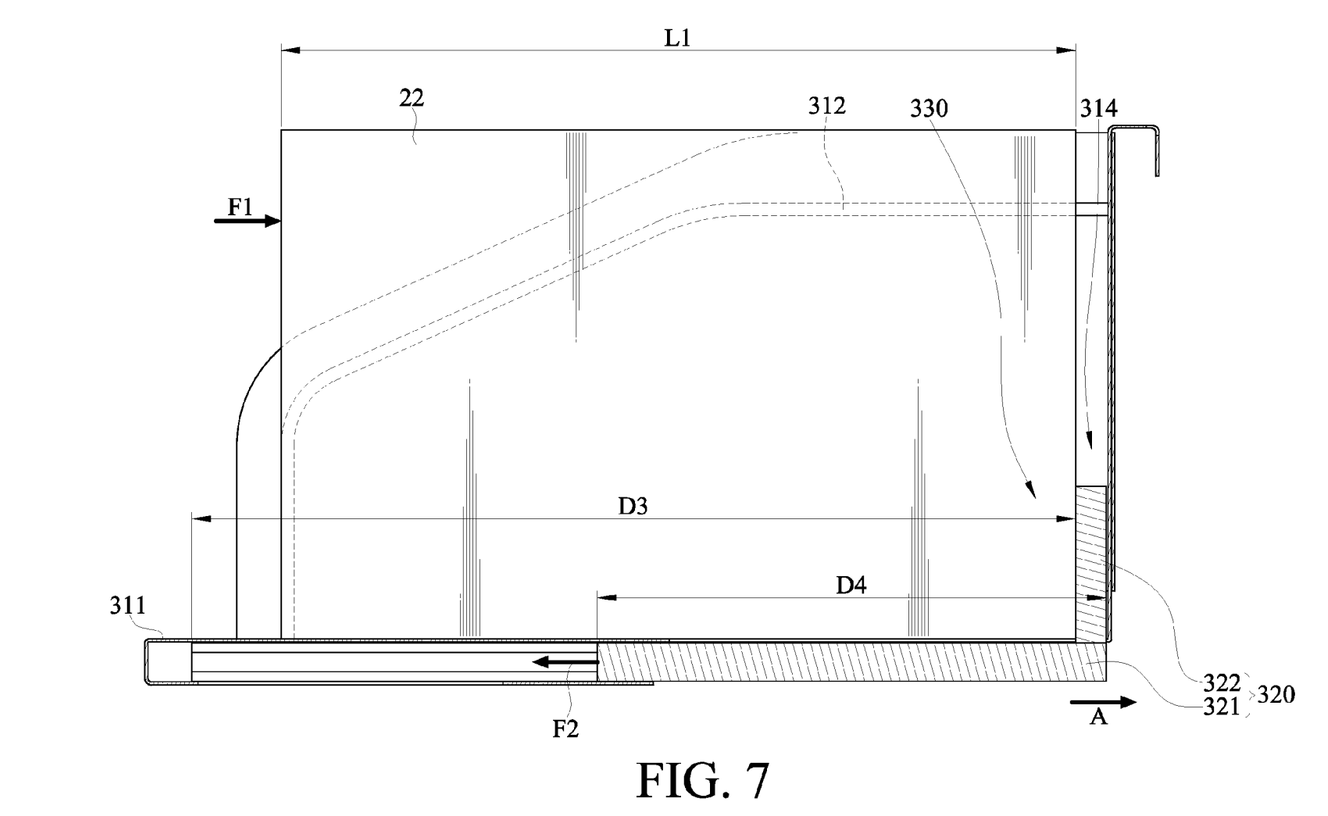
FIG. 7 is another cross-sectional view of the storage device with the mobile electronic device according to the first embodiment.

Please refer to FIG. 6 and FIG. 7. FIG. 6 is a cross-sectional view of the storage device with a mobile electronic device according to the first embodiment. FIG. 7 is another cross-sectional view of the storage device with the mobile electronic device according to the first embodiment.

As shown in FIG. 6, the minimum depth D2 of the storage compartment 330 is provided before the sliding component 321 slides relative to the base 311. When a user puts a first mobile electronic device 22, whose length L1 is equal to the maximum depth D3 of the storage compartment 330, into the storage compartment 330, a part of the first mobile electronic device 22 protrudes from the storage compartment 330 since the length L1 of the first mobile electronic device 22 is greater than the minimum depth D2 of the storage compartment 330.

As shown in FIG. 7, a force F1 is applied to the first mobile electronic device 22. When the force F1 is greater than a friction force F2 between the sliding components 321 that are adjacent to each other, the first mobile electronic device 22 pushes the adjusting structure 320 to slide along the sliding direction A so as to adjust the depth of the storage compartment 330 from the minimum depth D2 to the maximum depth D3, thereby almost all of the first mobile electronic device 22 is accommodated in the storage compartment 330. Furthermore, the friction force F2 between the adjacent sliding components 321 is favorable for preventing the sliding component 321 from unexpected movement. In detail, when the first mobile electronic device 22 pushes the adjusting structure 320 to slide, the friction force F2 is favorable for preventing the sliding component 321 from overly sliding relative to the base 311, thereby the sliding component 321 stops sliding after the force F1 is removed. The over sliding of the sliding component 321 may cause inconvenience when taking out the mobile electronic device due to the mobile electronic device being fully located in the accommodation space 314. In this embodiment, the friction force F2 between the sliding components 321 that are adjacent to each other is a maximum static friction force or a kinetic friction force.

Figure 8:
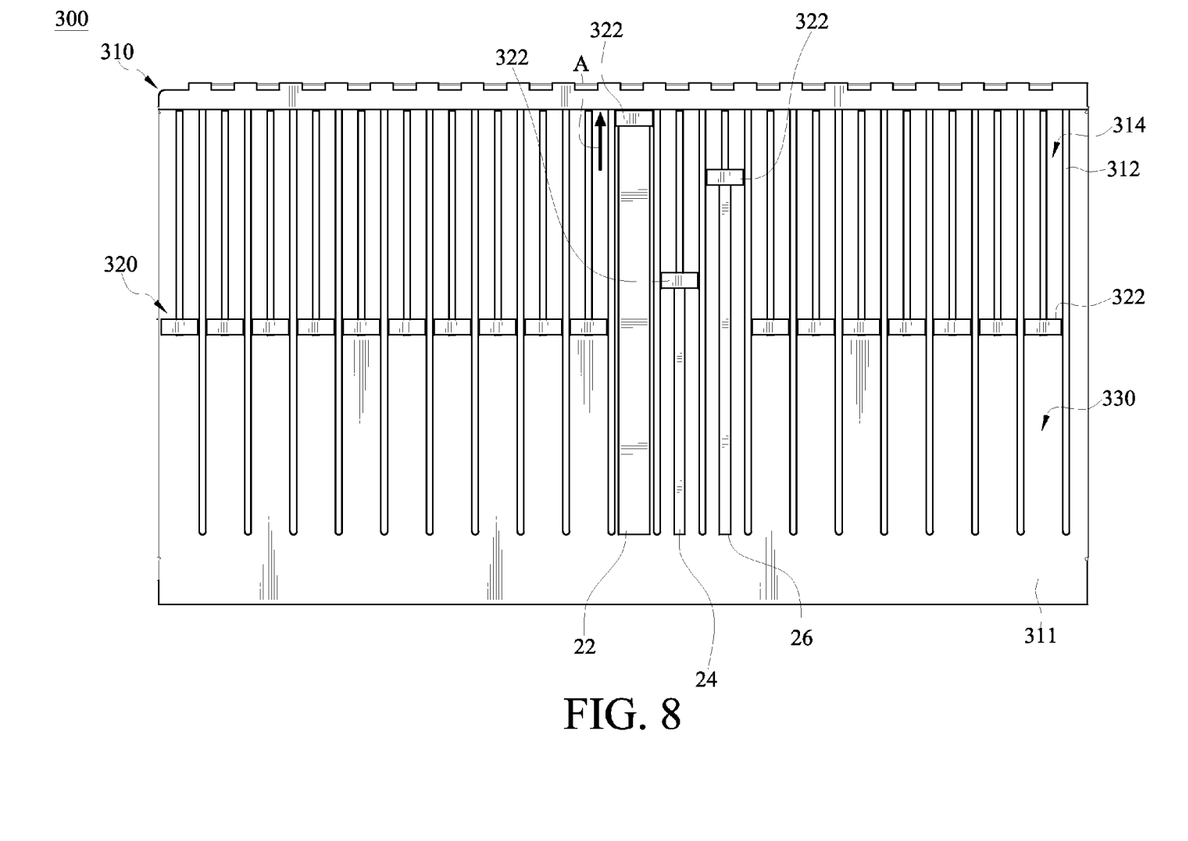
FIG. 8 is a top view of the storage device with a plurality of mobile electronic devices according to the first embodiment.

Please refer to FIG. 8. FIG. 8 is a top view of the storage device with a plurality of mobile electronic devices according to the first embodiment. In this embodiment, the first mobile electronic device 26, a second mobile electronic device 24 and a third mobile electronic device 26 with different sizes are put into the storage compartments 330 for charging. The length of the first mobile electronic device 22 is greater than that of the third mobile electronic device 26, and the length of the third mobile electronic device 26 is greater than that of the second mobile electronic device 24. The first mobile electronic device 22, the second mobile electronic device 24 and the third mobile electronic device 26 are located in three of the storage compartments 330 that are adjacent to each other, respectively, and the second mobile electronic device 24 is located between the first mobile electronic device 22 and the third mobile electronic device 26. When the blocking components 322 at different positions of the base 311 block the first mobile electronic device 22, the second mobile electronic device 24 and the third mobile electronic device 26, respectively, three lateral sides of the electronic devices 22, 24 and 26, further away from the blocking components 322 than the other three lateral sides facing the blocking components 322, are flush with each other. Therefore, the blocking components 322 are favorable for preventing the electronic devices 22, 24 and 26 from overly sliding into the storage compartments 330 so that it is convenient for the user to remove the electronic devices 22, 24 and 26 from the storage compartments 330 of the charging cabinet 10.

Figure 9:
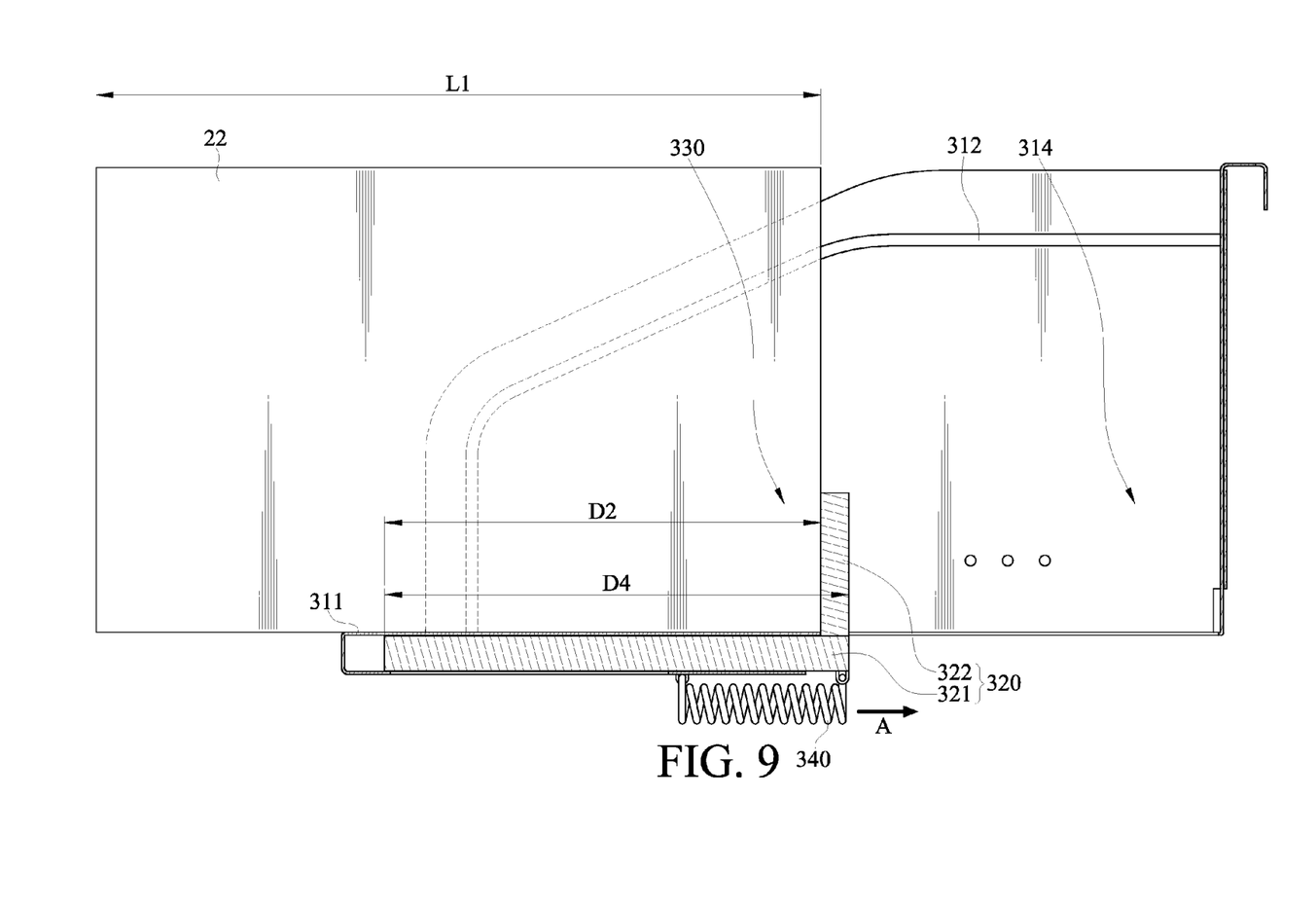
FIG. 9 is a cross-sectional view of a storage device with a mobile electronic device according to a second embodiment.
Figure 10:
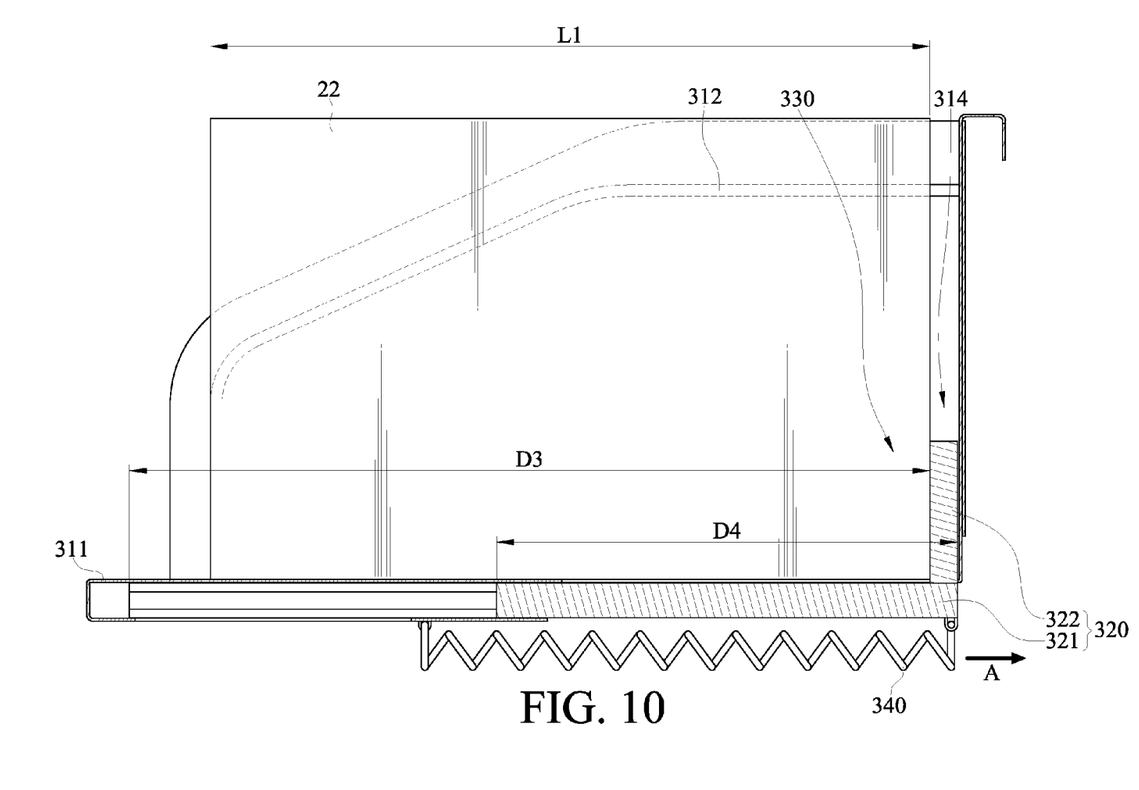
FIG. 10 is another cross-sectional view of the storage device with the mobile electronic device according to the second embodiment.

Please refer to FIG. 9 and FIG. 10. FIG. 9 is a cross-sectional view of a storage device with a mobile electronic device according to a second embodiment. FIG. 10 is another cross-sectional view of the storage device with the mobile electronic devices according to the second embodiment. Since this embodiment is similar to the first embodiment, only the differences will be illustrated hereafter.

In this embodiment, the storage device 300 further includes a plurality of elastic components 340. The elastic component 340 is, for example. an extension spring. Two ends of each of the elastic components 340 are connected to the base 311 and the sliding component 321. respectively. The elastic component 340 is for driving the adjusting structure 320 to move along an opposite direction of the sliding direction A. In detail, the force is applied to the first mobile electronic device 22 abutting against the blocking component 322 so as to drive the blocking component 322 to slide relative to the base 311, thereby the elastic component 340 is compressed and stores an elastic energy. When the user removes the first mobile electronic device 22 from the charging cabinet 10, the elastic component 340 releases the elastic energy so as to reset the adjusting structure 320.

Figure 11:
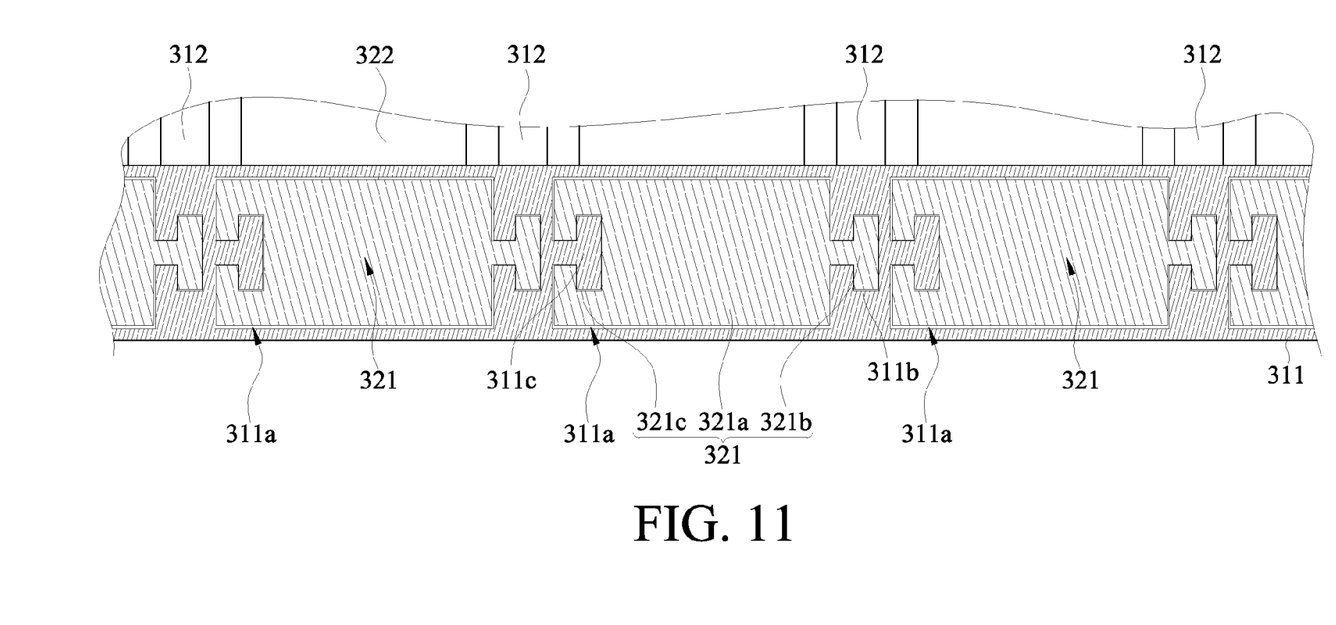
FIG. 11 is a cross-sectional view of a storage device according to a third embodiment.

In the first embodiment, the adjacent sliding components 321 are joined to each other, but the disclosure is not limited thereto. Please refer to FIG. 11. FIG. 11 is a cross-sectional view of a storage device according to a third embodiment. Since this embodiment is similar to the first embodiment, only the differences will be illustrated hereafter.

In this embodiment, the sliding components are joined to the base 311. In detail, the base 311 includes a plurality of sliding grooves 311a, a plurality of third joint parts 311b and a plurality of fourth joint parts 311c. The third joint part 311b and the fourth joint part 311c are located at two sides of the sliding groove 311a. respectively. The first joint parts 321b of the sliding components 321 are interlocked with the third joint parts 311b, respectively. The second joint parts 321c of the sliding components 321 are interlocked with the fourth joint parts 311c, respectively. Therefore, the sliding components 321 are for sliding relative to the base 311 along the sliding grooves 311a, respectively.

According to the disclosure, the sliding component of the adjusting structure is for sliding relative to the base so as to adjust the depth of the storage compartment, thereby the storage device is favorable for accommodating the electronic devices having different sizes. Furthermore, the blocking component is favorable for preventing the electronic device from overly sliding into the storage compartment so that it is convenient for the user to remove the electronic device from the charging cabinet.

What is claimed is:

1. A storage device, comprising:
a frame comprising a base and a plurality of partition components, the plurality of partition components standing on the base so that the plurality of partition components and the base together form a plurality of accommodation spaces; and
a plurality of adjusting structures each comprising a sliding component and a blocking component that are connected to each other, the plurality of sliding components slidably disposed on the base; the plurality of blocking components located within the accommodation spaces, respectively, and the plurality of blocking components protruding from the base so that the base, the plurality of partition components and the plurality of blocking components together forming a plurality of storage compartments; the plurality of sliding components for sliding relative to the base so as to adjust depths of the storage compartments, respectively;
wherein each of the plurality of sliding components comprises a main part, a first joint part and a second joint part, the first joint part and the second joint part are located at two sides of the main part that are opposite to each other, respectively, and the plurality of blocking components are fastened to the main parts, respectively; for three of the plurality of sliding components that are arranged in sequence, the first joint part and the second joint part of one of the three sliding components are interposed into the second joint part of another one of the three sliding components and the first joint part of the other one of the three sliding components, respectively.

2. The storage device according to claim 1, wherein a length of the sliding component along a sliding direction is greater than a maximum slidable distance of the sliding component.

3. The storage device according to claim 1, wherein the first joint part is a protrusion, and the second joint part is a slot corresponding to the protrusion.

4. The storage device according to claim 1, further comprising a plurality of elastic components, and two ends of each of the plurality of elastic components being connected to the base and the sliding component, respectively.

5. A charging cabinet, comprising:
a case;
a power supply disposed in the case, and the power supply comprising a plurality of sockets; and
the storage device disposed in the case, and the storage device comprising:
a frame comprising a base and a plurality of partition components, the plurality of partition components standing on the base so that the plurality of partition components and the base together form a plurality of accommodation spaces; and
a plurality of adjusting structures each comprising a sliding component and a blocking component that are connected to each other, the plurality of sliding components slidably disposed on the base; the plurality of blocking components located within the accommodation spaces, respectively, and the plurality of blocking components protruding from the base so that the base, the plurality of partition components and the plurality of blocking components together forming a plurality of storage compartments; the plurality of sliding components for sliding relative to the base so as to adjust depths of the storage compartments, respectively;
wherein each of the plurality of sliding components comprises a main part, a first joint part and a second joint part, the first joint part and the second joint part are located at two sides of the main part that are opposite to each other, respectively, and the plurality of blocking components are fastened to the main parts, respectively; for three of the plurality of sliding components that are arranged in sequence, the first joint part and the second joint part of one of the three sliding components are interposed into the second joint part of another one of the three sliding components and the first joint part of the other one of the three sliding components, respectively.

6. The charging cabinet according to claim 5, wherein a length of the sliding component along a sliding direction is greater than a maximum slidable distance of the sliding component.

7. The charging cabinet according to claim 5, wherein the first joint part is a protrusion, and the second joint part is a slot corresponding to the protrusion.

8. The charging cabinet according to claim 5, further comprising a plurality of elastic components, and two ends of each of the plurality of elastic components being connected to the base and the sliding component, respectively.

9. A storage device, comprising:
a frame comprising a base and a plurality of partition components, the plurality of partition components standing on the base so that the plurality of partition components and the base together form a plurality of accommodation spaces; and
a plurality of adjusting structures each comprising a sliding component and a blocking component that are connected to each other, the plurality of sliding components slidably disposed on the base; the plurality of blocking components located within the accommodation spaces, respectively, and the plurality of blocking components protruding from the base so that the base, the plurality of partition components and the plurality of blocking components together forming a plurality of storage compartments; the plurality of sliding components for sliding relative to the base so as to adjust depths of the storage compartments, respectively;
wherein each of the plurality of sliding components comprises a main part, a first joint part and a second joint part, the base comprises a plurality of sliding grooves, a plurality of third joint parts and a plurality of fourth joint parts; the third joint part and the fourth joint part are located at two sides of the sliding groove, respectively; the first joint parts are interposed into the third joint parts, respectively, and the second joint parts are interposed into the fourth joint parts, respectively.

10. A charging cabinet, comprising:
a case;
a power supply disposed in the case, and the power supply comprising a plurality of sockets; and
the storage device according to claim 1, and the storage device disposed in the case, and the storage device comprising:
a frame comprising a base and a plurality of partition components, the plurality of partition components standing on the base so that the plurality of partition components and the base together form a plurality of accommodation spaces; and
a plurality of adjusting structures each comprising a sliding component and a blocking component that are connected to each other, the plurality of sliding components slidably disposed on the base; the plurality of blocking components located within the accommodation spaces, respectively, and the plurality of blocking components protruding from the base so that the base, the plurality of partition components and the plurality of blocking components together forming a plurality of storage compartments; the plurality of sliding components for sliding relative to the base so as to adjust depths of the storage compartments, respectively;
wherein each of the plurality of sliding components comprises a main part, a first joint part and a second joint part, the base comprises a plurality of sliding grooves, a plurality of third joint parts and a plurality of fourth joint parts; the third joint part and the fourth joint part are located at two sides of the sliding groove, respectively; the first joint parts are interposed into the third joint parts, respectively, and the second joint parts are interposed into the fourth joint parts, respectively.

* * * * *